(12) United States Patent
Cosentino

(10) Patent No.: US 6,720,065 B1
(45) Date of Patent: Apr. 13, 2004

(54) DECORATIVE LAMINATED PANEL WITH HIGH DISTINCTNESS OF IMAGE

(75) Inventor: Steven R. Cosentino, Quinton, VA (US)

(73) Assignee: DuPont Teijin Films U.S. Limited Partnership, Wilmington, DE (US)

( * ) Notice: Subject to any disclaimer, the term of this patent is extended or adjusted under 35 U.S.C. 154(b) by 0 days.

(21) Appl. No.: 10/447,977

(22) Filed: May 29, 2003

(51) Int. Cl.$^7$ .................. B32B 27/08; B32B 27/18; B32B 27/30; B32B 27/36; B32B 15/08
(52) U.S. Cl. .................. 428/212; 428/323; 428/344; 428/346; 428/355 R; 428/412; 428/458; 428/480; 428/483; 428/910; 156/308.2
(58) Field of Search .................. 428/212, 323, 428/343, 344, 346, 347, 348, 355 R, 412, 458, 480, 483, 910; 156/308.2

(56) References Cited

U.S. PATENT DOCUMENTS

| | | | |
|---|---|---|---|
| 3,107,139 A | 10/1963 | Cornforth et al. | |
| 3,871,947 A | 3/1975 | Brekken | |
| 4,165,210 A | 8/1979 | Corbett | |
| 4,375,494 A | 3/1983 | Stokes | |
| 4,606,976 A * | 8/1986 | Hensel et al. | 428/480 |
| 4,680,204 A * | 7/1987 | Das et al. | 427/407.1 |
| 4,900,611 A * | 2/1990 | Carroll, Jr. | 428/216 |
| 4,957,820 A * | 9/1990 | Heyes et al. | 428/623 |
| 5,286,528 A | 2/1994 | Reafler | |
| 5,372,867 A | 12/1994 | Hasegawa et al. | |
| 5,518,786 A | 5/1996 | Johnson et al. | |
| 5,894,048 A * | 4/1999 | Eckart et al. | 428/339 |
| 6,018,013 A | 1/2000 | Yoshida et al. | |
| 6,042,678 A | 3/2000 | Johnson et al. | |
| 6,060,135 A * | 5/2000 | Service | 428/31 |
| 6,071,599 A * | 6/2000 | Kosuge et al. | 428/213 |
| 6,287,672 B1 | 9/2001 | Fields et al. | |
| 6,348,960 B1 | 2/2002 | Etori et al. | |
| 6,403,005 B1 | 6/2002 | Mientus et al. | |
| 6,472,046 B1 | 10/2002 | Kubo et al. | |
| 2001/0005282 A1 * | 6/2001 | Etori et al. | 359/453 |

FOREIGN PATENT DOCUMENTS

| | | |
|---|---|---|
| GB | 1115007 | 5/1968 |
| JP | 07-166037 | 6/1995 |
| WO | WO 97/11847 | 4/1997 |

* cited by examiner

Primary Examiner—Vivian Chen
(74) Attorney, Agent, or Firm—RatnerPrestia

(57) ABSTRACT

A laminated structure having a film composite overlying a substrate sheet, used as a decorative panel for appliances and motor vehicles. The laminated structure has high distinctness of image in both the machine direction and the transverse direction, and a ratio of these approaching 1.0.

30 Claims, 1 Drawing Sheet

DECORATIVE LAMINATED PANEL WITH HIGH DISTINCTNESS OF IMAGE

FIELD OF THE INVENTION

This invention relates to decorative panels for appliances. More particularly, the invention relates to the use of laminated structures for providing these decorative panels.

BACKGROUND OF THE INVENTION

An appliance generally has a visible external surface. Such a surface can consist of a decorative panel that can be painted or constructed of colored material for aesthetic purposes. For instance, a dishwasher, trash compactor, or other kitchen appliance can have a decorative front surface. A front panel of an appliance can be interchangeable so that a user can change the decorative look of the appliance. For example, multiple panels of different colors can be provided with the appliance, so that a user can select and install a desired panel.

In other types of appliances, for example clothes washers and dryers, stoves and refrigerators, panels may be shaped to form corners, such that areas other than just the front of the appliance may be covered. In any of these ore other applications, it is sometimes desirable to use a panel providing special visual effects. One particularly desirable effect, especially for consumer-oriented appliances, is a high Distinctness of Image (DOI).

Distinctness of image is defined as the sharpness with which object outlines are reflected by a surface. This measurement is frequently used by automotive and architectural coatings manufacturers to indicate the quality of a finish, with high DOI levels (up to a maximum possible value of 100) being desired. Additionally, it is desired that surfaces have the same, or at least nearly the same, DOI when viewed from different angles. Thus it is common to measure DOI of a surface from two different, mutually perpendicular directions.

In the typical situation, the object of interest is some kind of sheet material that has been manufactured on a line, and which therefore has an identifiable machine direction (MD) and a transverse direction (TD) perpendicular to it. Frequently, DOI in the machine direction is higher than that in the transverse direction, typically by a large margin. The relative equality of these measurements is commonly captured as a ratio of MD to TD, with a value of 1.0 being ideal. Ratios of MD to TD vary widely, depending on the type of surface and the type of process utilized to apply a glossy finish to the sheet, and in many cases may be about 1.5 or even higher. Such high DOI ratios are however undesirable for products in certain market niches.

Many different types of surface finishes exist, and accordingly, DOI measurements vary widely accordingly. Water-based coatings, desirable from an environmental perspective, tend to give poor DOI in both the machine direction and the transverse direction. Solvent-based coatings tend to give better DOI, but require solvent control measures and disposal procedures in order to meet environmental needs. In addition, solvent based coatings applied by a roller coating process tend to have a DOI in the TD significantly lower than in the MD, resulting in an inferior quality finish. Additionally, finishes based on coating with a water-based or solvent-based composition typically suffer from imperfections due to roughness and unevenness in the coating as applied, or due to roughness and/or imperfections in the surface receiving the finish.

In International Publication Number WO 97/11847, issued as EP 0 862 514 B1. Donnelan et al disclose a composite polyester sheet having an opaque polyester core layer, a transparent polyester outer layer on a first surface of the core layer, and a heat-sealable layer on a second surface of the core layer. The composite sheet is said to be suitable for laminating to a metal sheet for the production of cans, and is said to reduce or substantially overcome problems relating to excessive wear of punches/dies used for forming the can, and/or scoring of the can surface. The core layer and/or transparent outer layer are preferably biaxially oriented to achieve a satisfactory combination of mechanical and physical properties, but they may be uniaxially oriented. There is no mention of optical properties such as DOI in this patent application.

There continues to be a need for providing sheet metal based panels for appliances, exhibiting high distinctness of image and a ratio of distinctness of image in the machine direction vs. the transverse direction of close to 1 for manufacturing consumer products, particularly decorative panels for appliances.

SUMMARY OF THE INVENTION

In one aspect, the invention is an appliance panel comprising a laminated structure. The structure comprises a substrate sheet having adhered thereto a biaxially oriented film composite comprising a colored polyester layer adjacent and coextensive with a clear layer comprising a polyester. The colored polyester layer lies between the substrate sheet and the clear layer, and the laminated structure has a machine direction and a transverse direction corresponding to that of the film composite. The laminated structure forms a viewable surface of the appliance panel; and the laminated structure has a machine direction distinctness of image greater than about 80, a transverse direction distinctness of image greater than about 80, and a ratio of the machine direction to the transverse direction distinctness of image of less than 1.30.

In another aspect, the invention is an appliance comprising a panel, the panel comprising a laminated structure. The structure comprises a substrate sheet having adhered thereto a biaxially oriented film composite comprising a colored polyester layer adjacent and coextensive with a clear layer comprising a polyester. The colored polyester layer lies between the substrate sheet and the clear layer, and the laminated structure has a machine direction and a transverse direction corresponding to that of the film composite. The laminated structure forms a viewable surface of the appliance panel; and the laminated structure has a machine direction distinctness of image greater than about 80, a transverse direction distinctness of image greater than about 80, and a ratio of the machine direction to the transverse direction distinctness of image of less than 1.30.

In yet another aspect, the invention is a method of making an appliance. The method comprises providing a laminated structure. The structure comprises a substrate sheet having adhered thereto a biaxially oriented film composite comprising a colored polyester layer adjacent and coextensive with a clear layer comprising a polyester. The colored polyester layer lies between the substrate sheet and the clear layer, and the laminated structure has a machine direction and a transverse direction corresponding to that of the film composite. The laminated structure forms a viewable surface of the appliance panel; and the laminated structure has a machine direction distinctness of image greater than about 80, a transverse direction distinctness of image greater than about 80, and a ratio of the machine direction to the transverse direction distinctness of image of less than 1.30. The method also comprises forming the laminated structure to provide a viewable surface of the appliance.

In a further aspect, the invention is a motor vehicle panel comprising a laminated structure. The structure comprises a substrate sheet having adhered thereto a biaxially oriented film composite comprising a colored polyester layer adjacent and coextensive with a clear layer comprising a polyester. The colored polyester layer lies between the substrate sheet and the clear layer, and the laminated structure has a machine direction and a transverse direction corresponding to that of the film composite. The laminated structure forms a viewable surface of the motor vehicle panel; and the laminated structure has a machine direction distinctness of image greater than about 80, a transverse direction distinctness of image greater than about 80, and a ratio of the machine direction to the transverse direction distinctness of image of less than 1.30.

DETAILED DESCRIPTION OF THE INVENTION

The invention will next be illustrated with reference to the figures, wherein the same numbers indicate the same elements in all figures. Such figures are intended to be illustrative rather than limiting and are included herewith to facilitate the explanation of the present invention. The figures are not to scale, and are not intended to serve as engineering drawings.

Figure 1:
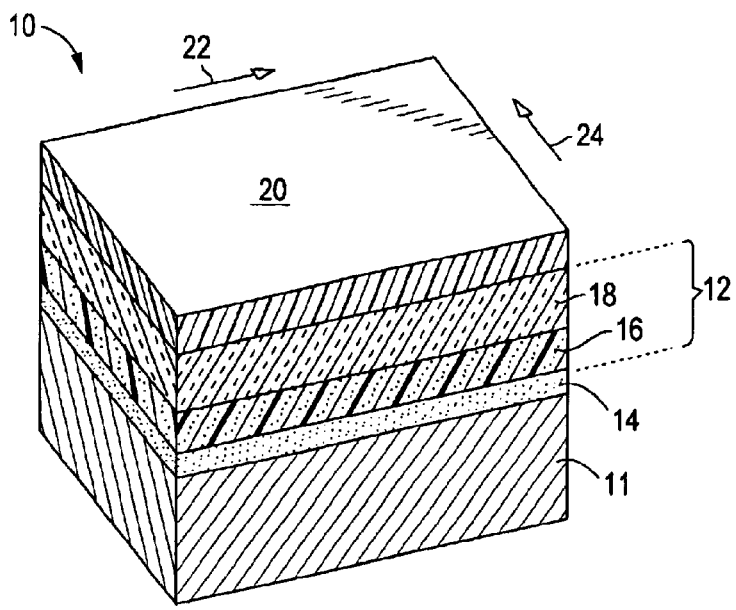
FIG. 1 is a perspective view of a portion of a panel comprising a laminated structure, according to an exemplary embodiment of the invention.

Referring now to FIG. 1, there is shown a portion of a panel comprising a laminated structure, indicated generally at 10, according to an exemplary embodiment of the invention. Laminated structure 10 comprises a substrate sheet 11, to which is adhered a film composite 12 comprising a colored layer 16 and a clear layer 18. The film composite 12 is adhered to the substrate sheet 11 by means of an adhesive layer 14. Lying on top of clear layer 18 is an optional scratch-resistant layer 20. The laminated structure 10 has a machine direction 22 and a transverse direction 24 at right angles thereto. The machine direction corresponds to the direction in which the film composite 12 travels down the manufacturing line on which it is made.

Colored layer 16 and clear layer 18 combined typically give a thickness of film composite 12 of from about 5 μm to about 500 μm, preferably from about 12 μm to about 100 μm, still more preferably from about 23 μm to about 75 μm. Typically, clear layer 18 may vary from about 1% to about 60% of the total thickness, more preferably about 2% to about 40% of the total combined thickness of layers 16 and 18. Generally the best DOI is achieved at lower thicknesses of layer 18.

The specific thickness of colored layer 16 is typically selected to provide the desired optical properties such as opacity and color. Generally colored layer 16 thickness is minimized due to the cost of the coloring pigments and additives. Colored layer 16 and/or clear layer 18 are then adjusted to provide the appropriate total film thickness suitable for processing in lamination machinery. The selection of the thickness of each layer must also be within the limitations of the particular extrusion equipment used, and thus may vary.

Colored layer 16 may itself be a multi-layer coextruded structure that can provide for unique or novel optical effects. For example, layer 16 may comprise a pigmented layer coextruded with a clear layer containing metal flakes or a reflective pigment that would provide for a sparkling optical effect. Alternatively, colored layer 16 could be reverse-printed for various visual effects.

Adhesive layer 14, if it is a coextruded polyester (to be described below), may constitute from about 5% to about 60% of the combined thickness of film composite 12 and adhesive layer 14, preferably from about 10% to about 40%. If adhesive layer 14 is a coated adhesive such as for example an ethylene-vinyl acetate copolymer or a copolyester, it may be applied at a loading level of from about 2 to about 30 g/m$^2$, preferably from about 5 to about 15 g/m$^2$.

Both colored layer 16 and clear layer 18 comprise a polymer. In one exemplary embodiment, both layers comprise a linear polyester. For each layer, the linear polyester has an intrinsic viscosity from about 0.5 to about 0.8, with about 0.6 being typical. Exemplary polyesters for preparing layers 16 and 18 are biaxially oriented polyethylene terephthalate (PET) film and biaxially oriented polyethylene naphthalate (PEN) film.

Especially useful for fabricating colored layer 16 and/or colored layer 18 is polyethylene terephthalate that has been biaxially oriented and heatset. Such a material is well known in the art, and is described for example in U.S. Pat. No. 4,375,494 to Stokes, incorporated herein by reference.

Polyethylene terephthalate polymer preparation techniques are well known to those skilled in the art and are disclosed in many texts, such as *Encyclopedia of Polymer Science and Engineering*, 2nd. Ed., Vol. 12, Wiley, N.Y., pp. 1–313. The polymer is typically obtained by condensing the appropriate dicarboxylic acid or its lower alkyl diester with ethylene glycol. Polyethylene terephthalate is formed from terephthalic acid or an ester thereof, and polyethylene naphthalate is formed from 2,7-naphthalene dicarboxylic acid or an ester thereof.

In another embodiment of the invention, either or both of colored layer 16 and clear layer 18 may comprise a polyester that exhibits high moldability. Such a material may make it possible to form the laminated structure into an appliance panel without cracking the film. Exemplary materials for this purpose include copolyesters of PET, where the copolyester component can be its acid component or alcohol component. Examples of the acid component include aromatic dibasic acids such as isophthalic acid, phthalic acid and naphthalenedicarboxylic acid; aliphatic dicarboxylic acids such as adipic acid, azelaic acid, sebacic acid and decanedicarboxylic acid; alicyclic dicarboxylic acids such as cyclohexanedicarboxylic acid; etc. On the other hand, examples of the alcohol component include aliphatic diols such as butanediol and hexanediol; and alicyclic diols such as cyclohexanedimethanol; etc. These can be used alone or in a combination of two or more.

The ratio of the copolymerization components varies depending on their kinds, but is a ratio such that the melting point of the resulting polymer is in the range of 210° C. to 245° C., preferably 215° C. to 240° C., more preferably 220° C. to 235° C.

Exemplary copolyesters suitable for use in forming high-moldability colored layer 16 and clear layer 18 comprise terephthalic acid in an amount of 82 to 100 mol % and 2,6-naphthalenedicarboxylic acid, or a combination of 2,6-naphthalenedicarboxylic acid and one or more other dicarboxylic acids to constitute 0 to 18 mol % of the total of all dicarboxylic acid components.

Illustrative examples of the other dicarboxylic acid include aromatic dicarboxylic acids such as isophthalic acid and phthalic acid; aliphatic dicarboxylic acids such as adipic acid, azelaic acid, sebacic acid and decanedicarboxylic acid; and alicyclic dicarboxylic acids such as cyclohexanedicarboxylic acid. They may be used alone or in combination of two or more.

Other exemplary copolyesters suitable for use in forming high-moldability colored layer 16 and clear layer 18 may comprise ethylene glycol in an amount of 82 to 100 mol % and cyclohexanedimethanol or a combination of cyclohexanedimethanol and another diol in an amount of 0 to 18 mol % of the total of all diol components.

Illustrative examples of the other diol include aliphatic diols such as diethylene glycol, propylene glycol, neopentyl glycol, butanediol, pentanediol and hexanediol; alicyclic diols such as cyclohexanedimethanol; aromatic diols such as bisphenol A; and polyalkylene glycols such as polyethylene glycol and polypropylene glycol. They may be used alone or in combination of two or more.

It is particularly preferable that all the dicarboxylic acid components of the copolyester consist of terephthalic acid and 2,6-naphthalenedicarboxylic acid and that all the diol components of the copolyester consist of ethylene glycol.

If a polyester is used for making colored layer 16 or clear layer 18, the intrinsic viscosity of the polyester may be from about 0.52 to about 0.80, preferably 0.54 to 0.70, particularly preferably 0.57 to 0.65. If the intrinsic viscosity is too low, even if other physical properties are appropriate and lamination on a substrate sheet is carried out satisfactorily, the film may become brittle. There does not appear to be a performance disadvantage to using polymers with intrinsic viscosity above about 0.80, but such polymers tend to be more expensive and more difficult to process in extrusion machinery. For purposes of this invention, the intrinsic viscosity of a polyester is measured at 25° C. using o-chlorophenol as a solvent.

Colored layer 16 may comprise a particulate additive, for example to improve the visual appearance of the product. Layer 16 may be rendered opaque, by which is meant substantially impermeable to visible light, by incorporation into the polymer of an effective amount of an opacifying agent. Layer 16 may for example be pigmented with titanium dioxide, in which case it preferably exhibits a Transmission Optical Density (TOD) (Sakura Densitometer type PDA 65, transmission mode) in the range from 0.2 to 1.5, more preferably 0.25 to 1.25, particularly 0.35 to 0.75, and especially 0.45 to 0.65. When pigmented with carbon black, the optical density of colored layer 16 is typically significantly higher. In the case where the polymer of colored layer 16 comprises a polyester, suitable opacifying agents may include an incompatible resin filler, a particulate inorganic filler, a particulate organic pigment, carbon black, or a mixture of two or more such agents.

By an "incompatible resin" is meant a resin which either does not melt, or which is substantially immiscible with the polymer forming the layer, at the highest temperature encountered during extrusion and fabrication of the layer. The presence of an incompatible resin usually results in a layer 16 comprising microvoids, by which is meant that the layer comprises a cellular structure containing at least a proportion of discrete, closed cells. In the case where colored layer 16 comprises a polyester, suitable incompatible resins may include polyamides and olefin polymers, particularly a homo- or co-polymer of a mono-alpha-olefin containing up to 6 carbon atoms in its molecule, for incorporation into colored layer 16. Suitable materials include a low or high density olefin homopolymer, particularly polyethylene, polypropylene or poly-4-methylpentene-1, an olefin copolymer, particularly an ethylene-propylene copolymer, or a mixture of two or more thereof. Random, block or graft copolymers may be employed.

The amount of incompatible resin filler present in the layer 16 is preferably in the range from 2% to 30%, more preferably 3% to 20%, particularly 4% to 15%, and especially 5% to 10% by weight, based on the weight of the layer 16 polymer.

Particulate inorganic fillers suitable for generating an opaque colored layer 16 include conventional inorganic pigments and fillers, and particularly metal or metalloid oxides, such as alumina, silica and titania, and alkaline metal salts, such as the carbonates and sulfates of calcium and barium. The particulate inorganic fillers may be of the microvoid-forming type, or non-microvoiding type. Suitable particulate inorganic fillers may be homogeneous and consist essentially of a single filler material or compound, such as titanium dioxide or barium sulfate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the layer 16 polymer.

Organic pigments may also be used to impart color to colored layer 16, and may be especially useful when colors other than black or white are desired. Such pigments are well known in the art, and include for example phthalocyanine and anthraquinone. Dyes such as are known in the art may also be used to impart color to colored layer 16. Colored layer 16 may also include one or more flame retardant additives and/or ultraviolet stabilizers, such as are well known in the art.

Clear layer 18 may also contain a lubricant, to provide improved molding and minimize scratching of the surface. The lubricant may be of either an organic or inorganic material. Examples of inorganic lubricants include silica, alumina, titanium dioxide, calcium carbonate, barium sulfate, etc., and examples of organic lubricants include silicone particles, polytetrafluoroethylene, olefin waxes, etc. The lubricant typically has an average particle diameter of 2.5 $\mu$m or less, to minimize the formation of pinholes in the film composite and to minimize surface haze or surface roughness, which can detract from DOI and the visual appearance of the finished sheet.

Adhesive layer 14 is capable of forming an adhesive bond to film composite 12 and to substrate sheet 11. Typically adhesive layer 14 is formed on a surface of colored layer 16 of the film composite 12. The composite is subsequently attached to substrate sheet 11 by first heating the film and/or substrate sheet to a temperature high enough to soften layer 14 but not high enough to soften or melt the film composite 12, and then by applying pressure, typically by nipping the film to the metal with a rubber roll.

Adhesive layer 14 may comprise any of a number of materials meeting the above-mentioned requirements, and many such materials are known in the art, for example ethylene-vinyl acetate copolymers. In one exemplary embodiment of the invention, adhesive layer 14 may comprise a solvent based copolyester adhesive coating based on Vitel® 1200B resin, available from Bostik Findley, Inc., Middleton, Mass., and/or Crystar® 3991 resin, available from DuPont of Wilmington, Del. A typical solvent for applying such adhesives is a blend of tetrahydrofuran and toluene.

In another exemplary embodiment of the invention, adhesive layer 14 may comprise a thermal bonding polyester resin, particularly a copolyester resin derived from one or more dibasic aromatic carboxylic acids, such as terephthalic acid, isophthalic acid and hexahydroterephthalic acid, and one or more glycols, such as ethylene glycol, diethylene glycol, triethylene glycol and neopentyl glycol. Adhesive layer 14 may comprise a terephthalate-containing polyester. A preferred copolyester is derived from terephthalic acid and one or both of isophthalic acid and hexahydroterephthalic acid, and one or more glycols, preferably ethylene glycol. Exemplary copolyesters that provide satisfactory bonding properties in the amorphous state are those of ethylene terephthalate and ethylene isophthalate, especially in the molar ratios 60 to 90 mol % ethylene terephthalate and correspondingly 40 to 10 mol % ethylene isophthalate. Particularly preferred copolyesters comprise 70 to 85 mol % ethylene terephthalate and 30 to 15 mol % ethylene isophthalate, for example a copolyester of approximately 80 mol % ethylene terephthalate and approximately 20 mol % ethylene isophthalate.

In manufacturing film composites for use in making laminated structures according to the invention, it may be advantageous to provide film composite 12 and adhesive layer 14 together in the form of an adhesive-bearing film composite. Such an adhesive-bearing film composite may be formed by solvent casting or extrusion of the adhesive layer onto the surface of colored layer 16 of film composite 12, in the case where the composite comprises a biaxially oriented and heat-set film of polyethylene terephthalate or polyethylene naphthalate.

In the case where both colored layer 16 and clear layer 18 comprise biaxially oriented polyethylene terephthalate, and the adhesive layer 14 is a copolyester resin as described above, the adhesive-bearing film composite may be conveniently made by a process that includes multiple extrusion through a multiple orifice die or coextrusion of the composite layers, e.g. broadly as described in U.S. Pat. No. 3,871,947, followed by molecular orientation by stretching in one or more directions and heat setting. A convenient process and apparatus for coextrusion, known as single channel coextrusion, is described in U.S. Pat. No. 4,165,210 and GB patent specification No. 1,115,007. The method comprises simultaneously extruding streams of the first and second of two polyesters from two different extruders, uniting the two streams in a tube leading to a manifold of an extrusion die, and extruding the two polyesters together through the die under conditions of streamline flow so that the two polyesters occupy distinct regions of the flow without intermixing, whereby a film composite is produced. In preparing an adhesive-bearing film composite as described above, the method may be adapted to extrude three polyester streams to form adhesive layer 14, colored layer 16, and clear layer 18 simultaneously in a single sheet.

Biaxial orientation of the polyethylene terephthalate portions of the film composite may be accomplished by stretching the composite in sequence in two mutually perpendicular directions typically at temperatures in the range of about 78 to 125° C. Generally, the conditions applied for stretching the composite may function to partially crystallize the adhesive layer, and in such cases it is preferred to heat set the film composite under dimensional restraint at a temperature greater than the crystalline melting temperature of the adhesive layer, but lower than the crystalline melting temperature of the polyethylene terephthalate portions. The composite is then permitted or caused to cool, rendering the adhesive layer essentially amorphous while high crystallinity is maintained in the colored and clear portions. Therefore, the stretching operation is preferably followed by heat setting under dimensional restraint, typically at a temperature in the range 150 to 250° C. Convenient processes for stretching and heat setting are described in U.S. Pat. No. 3,107,139. Thus in one embodiment of the invention, the laminated structure 10 comprises a film formed by coextrusion so that it comprises three layers made of different materials, but forming one sheet of film.

A scratch-resistant layer 20 may optionally be provided as part of the laminated structure 10. By use of such a layer, marring of the surface may be reduced during manufacture, transportation, and end use of the structure. The layer may typically have a thickness ranging from about (0.1) $\mu$m to about 25 $\mu$m. It may comprise acrylic, urethane, polyester, epoxy, silicone, or other polymeric resins, and may be formulated for application and curing by any means known in the coating and laminating art, such as ultraviolet curing, electron beam curing, or thermal curing (resin in organic solvent, and water-based chemistries). The layer may incorporate inorganic particles, such as for example silica, and/or slip additives such as for example wax and/or polytetrafluoroethylene dispersions.

Scratch-resistant layer 20 is typically coated onto the clear layer 18 by any of the standard coating processes known in the art, for example gravure (direct, offset, reverse), Slot Die, dip, or other methods.

Film composites providing the desired high distinctness of image performance properties according to this invention may also be obtained by a process such as disclosed in Mientus et al, U.S. Pat. No. 6,403,005, by pinning the extruded molten thermoplastic film material onto a polished casting roll having a mirror finish. The thermoplastic film produced by this method achieves a superior gloss finish and has a ratio of distinctness of image in the machine direction to distinctness of image in the cross direction in the range of 1.3:1 to 1.0:1.

Substrate sheet 11 may be any of a number of metals, including but not limited to aluminum, copper, iron, mild steel, electrogalvanized or hot dip galvanized carbon steel, and stainless steel. The substrate sheet 11 may be in the form of a metal coil, such as is commonly used in the manufacture of appliances and other finished products, or it may be a part of such an appliance or other finished product. Additionally, a plastic sheet such as polyester, polystyrene, polyvinyl chloride, polypropylene, polyethylene, polycarbonate, etc may be used.

In the case where substrate sheet 11 is for example a metal coil, the laminated structure 10 may be formed by applying a water-based or solvent-based adhesive to the coil steel and/or to the colored layer 16 surface of a film composite 12, and subsequently adhering the two together. The exact means and formulations for applying such adhesives and joining the parts may differ from case to case depending upon a number of factors, and may be chosen according to the needs of the particular situation according to criteria well known in the art.

In one exemplary embodiment of the invention, the adhesive layer 14 may comprise a thermally bonding material such as a copolyester of the sort described above, and may be provided as part of an adhesive-bearing film composite as also described above. Application of such a structure to the substrate sheet 11 may be performed by use of in-line heat lamination equipment such as is well known in the art, and available from a number of suppliers. Such equipment typically allows for passage of substrate sheet 11 and the film composite through pressure rollers at a temperature in the range of about 140–200° C., thereby effecting adhesion of the composite to the substrate sheet.

It has been found that, prior to lamination to a substrate sheet, film composites comprising biaxially oriented polyester as described herein above exhibit high DOI in both the machine direction and the transverse direction, with both values typically being greater than or equal to about 80. More typically, the MD value is greater than or equal to about 90, and the TD value is greater than or equal to about 85.

Upon lamination of such film composites to substrate sheet 11, the resulting panels still exhibit high DOI in both the machine direction and the transverse direction, with both values typically being greater than or equal to about 80. More typically, the MD value is greater than or equal to about 83, and the TD value is greater than or equal to about 82. Moreover, a distinguishing characteristic of the invention is that it provides surfaces where the ratio of machine direction DOI to transverse direction DOI is close to unity, typically about 1.30 or less. More typically, the ratio is about 1.15 or less.

Figure 2:
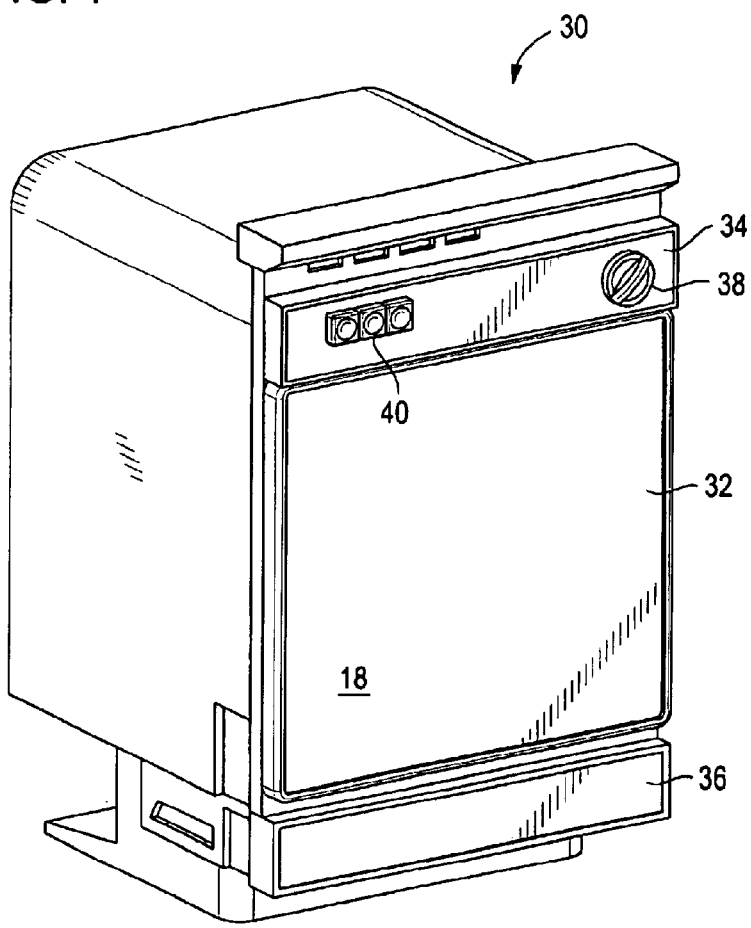
FIG. 2 is a front view of a dishwasher comprising a front panel, according to another exemplary embodiment of the invention.

The laminated structure forms a panel that is adapted to be used as at least a part of the viewable surface of an appliance, providing a finish with high DOI. FIG. 2 shows, according to another exemplary embodiment of the invention, a dishwasher 30 comprising a panel 32 on the front. The panel comprises laminated structure 10, of which the clear layer 18 is situated to be on the outside, i.e. it constitutes at least part of a viewable surface of the appliance. Although the depicted embodiment shows clear layer 18 outermost, there may be an additional scratch resistant layer 20 on top of clear layer 18, as discussed previously. Panel 32 may additionally comprise functional or decorative items (not shown) attached to the laminated structure, such as for example manufacturer logos and the like.

An appliance according to the invention may have more than one panel comprising a laminated structure, such as are shown at 34 and 3 in FIG. 2, indicating upper and lower panels, respectively. Any of the panels may have openings in them, for example to accommodate controls such as are shown at 38 and 40 on upper panel 34 in FIG. 2. In addition, panels according to the invention may be bent or otherwise formed to encompass more than one surface, for example by going around corners to provide a front and sides of an appliance in one unitized piece (not shown). Such structures may be especially well suited for items such as clothes washers and dryers, where not only the front but also the sides and top may suitably have a fine finish provided by a panel according to the invention.

Other nonlimiting examples of suitable appliances according to the invention include refrigerators, freezers, and microwave ovens. Panels for use in motor vehicles may also be provided according to the invention. It will be appreciated that other metal surfaces requiring a decorative finish may also be made according to the invention. Typically, appliances and other finished products made according to the invention will be formed from coil steel that has been converted to a laminated structure as described above, and then converted to their final shape by means such as bending, drilling, cutting, and other means known in the metalworking art.

EXAMPLES

Examples 1–2 were sections of film composite structures from a single roll of Melinex® 427, available from DuPont Teijin Films of Wilmington, Del. The films had a colored layer 72 microns in thickness, composed of polyester homopolymer of 0.58 intrinsic viscosity and containing 2 wt % carbon black, and a coextruded clear layer 3 microns in thickness, composed of polyester homopolymer of 0.58 intrinsic viscosity with no additives.

Examples 3–5 were sections from a single roll of a similar film composite, Melinex® 3426, available from DuPont Teijin Films. These sections had a colored layer 48 microns in thickness and a coextruded clear layer 2 microns in thickness, and there was an additional 0.02 micron thick acrylic adhesion primer coated on the clear layer. Determinations of DOI were performed using a Hunterlab Dorigen II according to ASTM method E 430–97. Results of these determinations are given in Table 1.

TABLE 1

| | Film Composites | | | | |
|---|---|---|---|---|---|
| Example Number | Colored Layer Thickness (μm) | Clear Layer Thickness (μm) | Clear Layer DOI (MD) | Clear Layer DOI (TD) | DOI Ratio MD/TD |
| 1 | 72 | 3 | 93.0 | 85.0 | 1.09 |
| 2 | 72 | 3 | 94.0 | 94.0 | 1.00 |
| 3 | 48 | 2 | 83.0 | 83.0 | 1.00 |
| 4 | 48 | 2 | 95.0 | 92.0 | 1.03 |
| 5 | 48 | 2 | 95.0 | 87.0 | 1.09 |

Film composite sections from the same rolls of film used in Examples 1–2 and 3–5 were then thermally laminated to a sheet of 300 micron biaxially oriented polyester film sheet with a heated nip roller at 300° F. using a polyester adhesive layer to form the laminated structures shown as Examples 6 and 7 in Table 2. Sample 6 was prepared from a section of the same roll of Melinex 427 used in Examples 1 and 2. Sample 7 was prepared from a section of the same roll of Melinex 3426 used in Examples 3–5. DOI values determined for these laminated structures are shown in Table 2.

Example 8 was a laminated structure prepared from a three-layer film composite. The colored layer 83 microns in thickness, itself consisted of a coextruded two layer structure with the first polyester layer 42 microns in thickness containing 2% carbon black and a clear polyester layer 42 microns in thickness. A coextruded clear layer, also 42 microns in thickness, was composed of polyester homopolymer of 0.58 intrinsic viscosity with no additives. The resulting 3-layer, 125-micron film composite with the black colored layer between 2 clear layers was thermally laminated to a 300-micron sheet of polyester as in Examples 6 and 7.

Example 9 was a laminated structure similar to that of Example 8, except that the colored layer was 50 microns in thickness, with the black layer and clear layer each 25 microns in thickness, and the coextruded clear layer was also 25 microns in thickness. For both of Examples 8 and 9, excellent DOI results were obtained (Table 2).

TABLE 2

Laminated Structures

| Example Number | Colored Layer Thickness (μm) | Clear Layer Thickness (μm) | Clear Layer DOI (MD) | Clear Layer DOI (TD) | DOI Ratio MD/TD |
|---|---|---|---|---|---|
| 6 | 72 | 3 | 82.0 | 83.0 | 0.99 |
| 7 | 48 | 2 | 83.0 | 82.0 | 1.01 |
| 8 | 83 | 42 | 85.7 | 81.5 | 1.05 |
| 9 | 50 | 25 | 85.0 | 80.0 | 1.06 |

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An appliance panel comprising:
   a laminated structure comprising a substrate sheet having adhered thereto a biaxially oriented film composite comprising a colored polyester layer adjacent and coextensive with a clear layer comprising a polyester, the colored polyester layer between the substrate sheet and the clear layer, the laminated structure having a machine direction and a transverse direction corresponding to that of the film composite;
   wherein the laminated structure forms a viewable surface of the appliance panel; and
   wherein the laminated structure forming the viewable surface has a machine direction distinctness of image greater than about 80, a transverse direction distinctness of image greater than about 80, and a ratio of the machine direction to the transverse direction distinctness of image of less than 1.30.

2. The appliance panel of claim 1 wherein each of the colored polyester layer and the clear layer comprises polyethylene terephthalate.

3. The appliance panel of claim 1 wherein each of the colored polyester layer and the clear layer comprises a copolyester having a melting point from about 210° C. to about 245° C.

4. The appliance panel of claim 1 wherein the clear layer comprises a lubricant having an average particle diameter of 2.5 μm or less.

5. The appliance panel of claim 1 wherein the colored polyester layer comprises a pigment.

6. The appliance panel of claim 1 wherein the colored polyester layer comprises microvoids.

7. The appliance panel of claim 1 wherein the colored polyester layer comprises a dye.

8. The appliance panel of claim 1 additionally comprising an adhesive layer adjacent, coextensive with, and between the colored polyester layer and the substrate sheet.

9. The appliance panel of claim 8 wherein the adhesive layer comprises a material having a glass transition temperature that is lower than both of a glass transition temperature of the clear layer and a glass transition temperature of the colored polyester layer.

10. The appliance panel of claim 8 wherein the adhesive layer comprises an amorphous copolyester of about 60 to about 90 mol % ethylene terephthalate and correspondingly about 40 to about 10 mol % ethylene isophthalate.

11. The appliance panel of claim 1 wherein the clear layer has a first surface adjacent the colored polyester layer, and a second surface opposite the first surface, the structure further comprising a scratch-resistant layer adjacent and coextensive with the second surface.

12. The appliance panel of claim 1 wherein the substrate sheet comprises a metal.

13. The appliance panel of claim 1 wherein the substrate sheet comprises steel.

14. The appliance panel of claim 1 wherein the substrate sheet comprises a material selected from the group consisting of polyester, polystyrene, polyvinyl chloride, polypropylene, polyethylene, polycarbonate, and combinations thereof.

15. An appliance comprising a panel, the panel comprising:
   a laminated structure comprising a substrate sheet having adhered thereto a biaxially oriented film composite comprising a colored polyester layer adjacent and coextensive with a clear layer comprising a polyester, the colored polyester layer between the substrate sheet and the clear layer, the laminated structure having a machine direction and a transverse direction corresponding to that of the film composite;
   wherein the laminated structure forms a viewable surface of the appliance panel; and
   wherein the laminated structure forming the viewable surface has a machine direction distinctness of image greater than about 80, a transverse direction distinctness of image greater than about 80, and a ratio of the machine direction to the transverse direction distinctness of image of less than 1.30.

16. The appliance of claim 15 wherein each of the colored polyester layer and the clear layer comprises polyethylene terephthalate.

17. The appliance of claim 15 wherein each of the colored polyester layer and the clear layer comprises a copolyester having a melting point from about 210° C. to about 245° C.

18. The appliance of claim 15 wherein the clear layer comprises a lubricant having an average particle diameter of 2.5 μm or less.

19. The appliance of claim 15 wherein the colored polyester layer comprises a pigment.

20. The appliance of claim 15 wherein the colored polyester layer comprises microvoids.

21. The appliance of claim 15 wherein the colored polyester layer comprises a dye.

22. The appliance of claim 15 additionally comprising an adhesive layer adjacent, coextensive with, and between the colored polyester layer and the substrate sheet.

23. The appliance of claim 22 wherein the adhesive layer comprises a material having a glass transition temperature that is lower than both of a glass transition temperature of the clear layer and a glass transition temperature of the colored polyester layer.

24. The appliance of claim 22 wherein the adhesive layer comprises an amorphous copolyester of about 60 to about 90 mol % ethylene terephthalate and correspondingly about 40 to about 10 mol % ethylene isophthalate.

25. The appliance of claim 15 wherein the clear layer has a first surface adjacent the colored polyester layer, and a second surface opposite the first surface, the structure further comprising a scratch-resistant layer adjacent and coextensive with the second surface.

26. The appliance of claim 15 wherein the substrate sheet comprises a metal.

27. The appliance of claim 15 wherein the substrate sheet comprises steel.

28. The appliance of claim 15 wherein the substrate sheet comprises a material selected from the group consisting of polyester, polystyrene, polyvinyl chloride, polypropylene, polyethylene, polycarbonate, and combinations thereof.

29. A method of making an appliance, the method comprising:

providing a laminated structure comprising a substrate sheet having adhered thereto a biaxially oriented film composite comprising a colored polyester layer adjacent and coextensive with a clear layer comprising a polyester, the colored polyester layer between the substrate sheet and the clear layer, the laminated structure having a machine direction and a transverse direction corresponding to that of the film composite; and forming the laminated structure to provide a viewable surface of the appliance;

wherein the laminated structure has a machine direction distinctness of image greater than about 80, a transverse direction distinctness of image greater than about 80, and a ratio of the machine direction to the transverse direction distinctness of image of less than 1.30.

30. A motor vehicle panel comprising:

a laminated structure comprising a substrate sheet having adhered thereto a biaxially oriented film composite comprising a colored polyester layer adjacent and coextensive with a clear layer comprising a polyester, the colored polyester layer between the substrate sheet and the clear layer, the laminated structure having a machine direction and a transverse direction corresponding to that of the film composite;

wherein the laminated structure forms a viewable surface of the motor vehicle panel; and wherein the laminated structure forming the viewable surface has a machine direction distinctness of image greater than about 80, a transverse direction distinctness of image greater than about 80, and a ratio of the machine direction to the transverse direction distinctness of image of less than 1.30.

\* \* \* \* \*

UNITED STATES PATENT AND TRADEMARK OFFICE
CERTIFICATE OF CORRECTION

PATENT NO. : 6,720,065 B1
DATED : April 13, 2004
INVENTOR(S) : Steven R. Cosentino It is certified that error appears in the above-identified patent and that said Letters Patent is hereby corrected as shown below:

<u>Column 9,</u>
Line 47, delete "3" and insert -- 36 --

Signed and Sealed this

Twentieth Day of July, 2004

JON W. DUDAS
*Acting Director of the United States Patent and Trademark Office*